Oct. 14, 1969  P. M. FIELD  3,472,589
OVERHEAD PROJECTOR

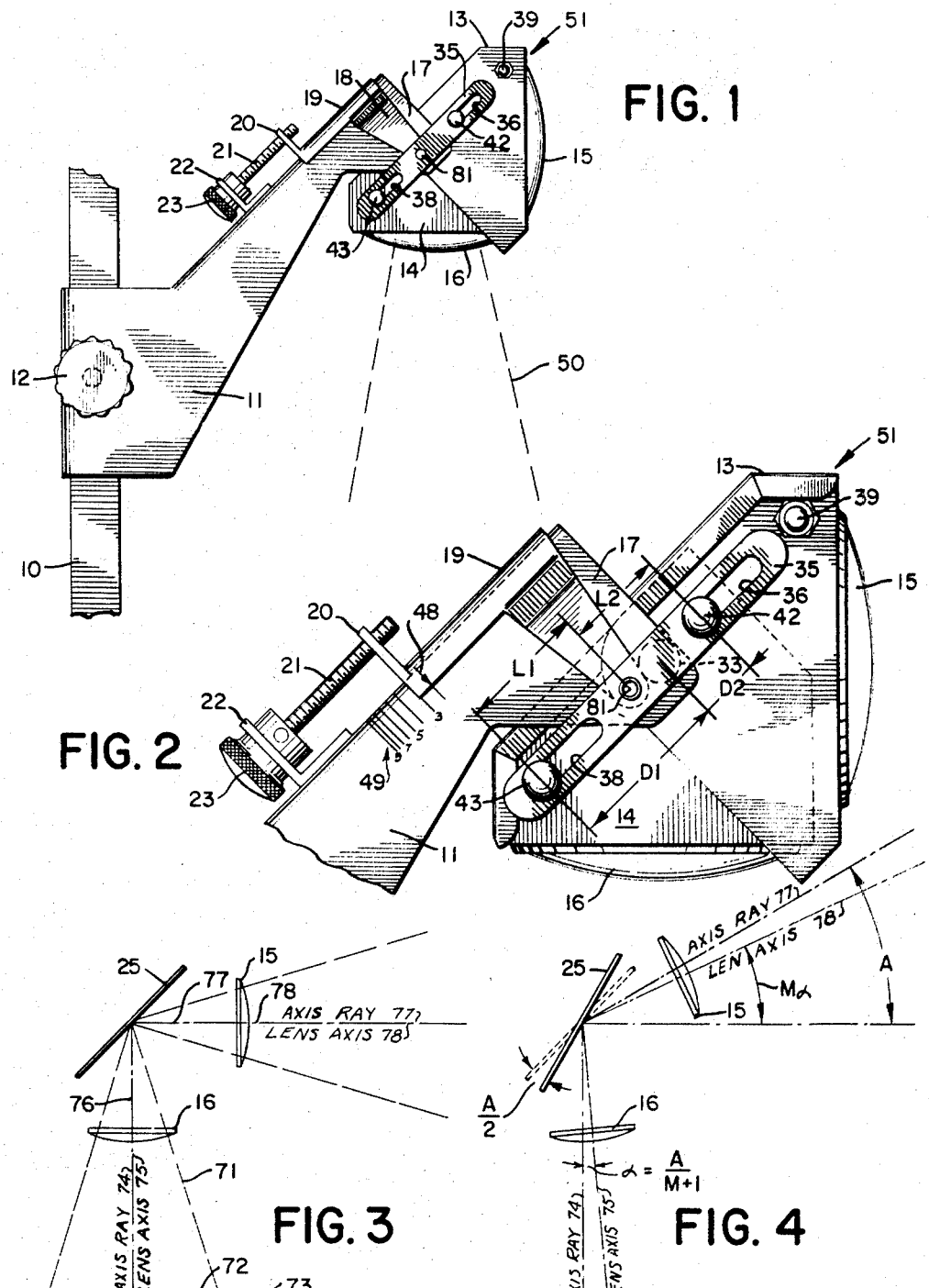

Filed Oct. 23, 1965  3 Sheets-Sheet 2

INVENTOR.
PHILIP M. FIELD
BY *Darby & Darby*
ATTORNEYS

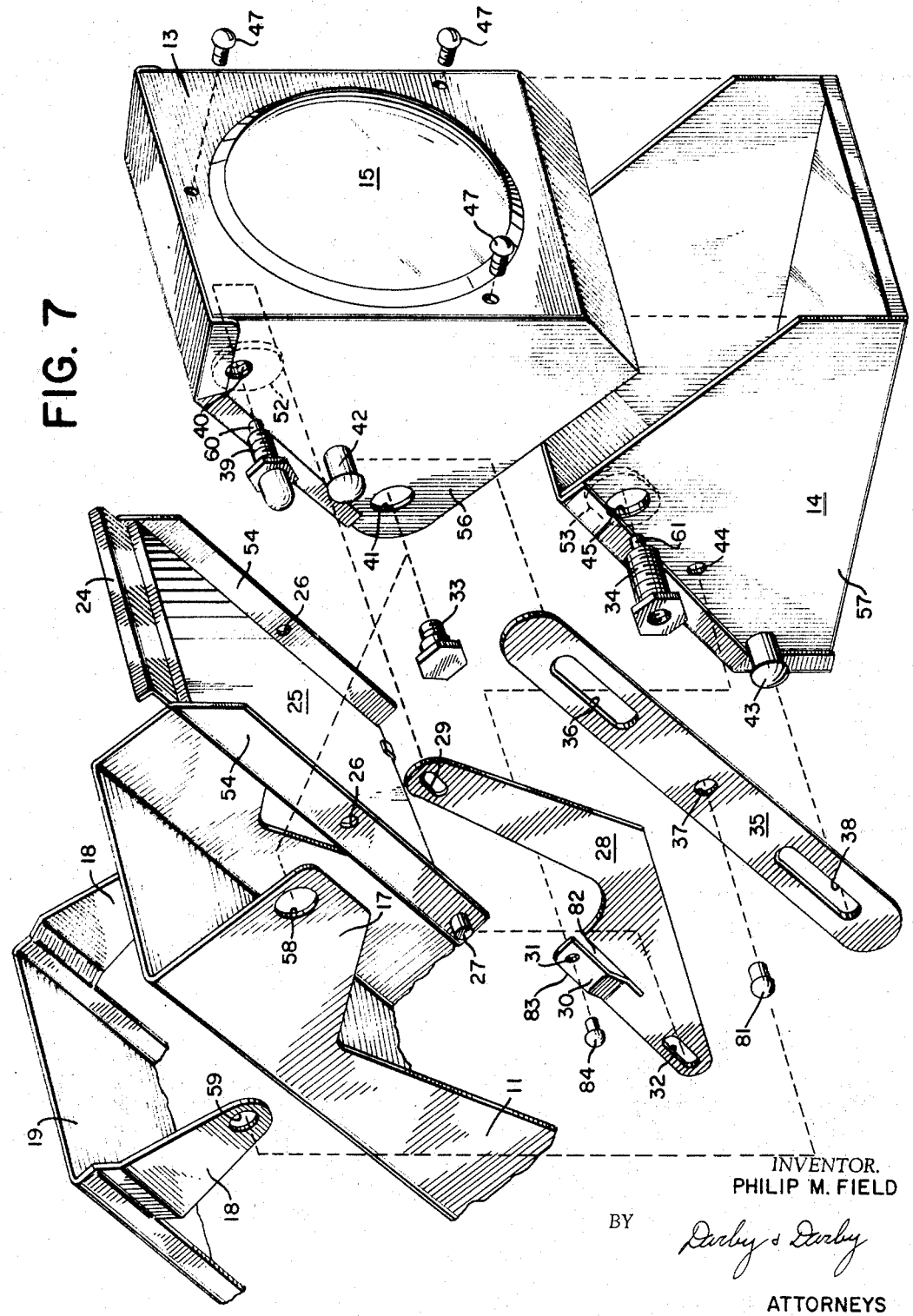

United States Patent Office 3,472,589
Patented Oct. 14, 1969

3,472,589
OVERHEAD PROJECTOR
Philip M. Field, Maplewood, N.J., assignor to Charles
Beseler Company, East Orange, N.J., a partnership
Filed Oct. 23, 1965, Ser. No. 502,897
Int. Cl. G03b 21/30
U.S. Cl. 353—98
25 Claims

ABSTRACT OF THE DISCLOSURE

An apparatus and method for projecting and elevating the images of transparent or opaque objects in a non-distorted form on a screen. This is accomplished by pivoting the projection lens system relative to the projection head mirror between one and two times the mirror displacement so as to maintain the focal plane of the image substantially coplanar with the projection screen.

---

This invention relates to transparency and opaque projectors and more particularly to the construction of a projector head for use in an overhead projector and a method of elevating the projected image without deleterious de-focussing.

An overhead projector is a visual demonstration device generally used to project a light image from a horizontally held material onto a vertical screen. Overhead projectors generally comprise a housing which carries a light source and associated optical elements for directing a vertical cone of light through a transparency-holding projection stage formed by a transparent plate which forms or is in the top wall of the housing. A projection head carrying a projection lens or lens system is suitably supported above the projection stage so that the vertical light cone passes into it, by which the magnified image is projected to a screen.

In the past, one form of projection head has included a mirror located between the two lens elements carried by the projection head. The cone of light enters a first, horizontal, lens element, is reflected by the mirror, and then passes through the second, generally vertical lens element. The first lens element maintains a vertical axis at all times. The second or vertical lens element and mirror are separately pivotable relative to the first lens element to permit elevation of the screen image by tilting the mirror and the axis of the second lens element upwardly, as required. Movement of the vertical second lens element automatically imparts rotation to the mirror in the correct ratio, by a mechanical linkage between the mirror and second lens. Details of this type of projector head are shown in my copending application Ser. No. 340,473, filed Jan. 27, 1964, now Patent No. 3,334,957.

In using a projector of this type, the tilting of the mirror for elevating the screen image causes a change in the direction of the axial ray leaving the lens, causing the axial ray and projected light cone to strike the screen at an angle. This in turn causes the distances from the second lens element to the top and to the bottom of the image to differ, so that different portions of the image are not simultaneously in focus. In this type of projector, the upper portion of the image focusses in front of the screen while the lower portion of the image focusses beyond the screen, if the center of the image is focussed at the screen.

One way to overcome this effect is to tilt the screen forward as the image is elevated, so as to retain the screen perpendicular to the axial ray. However, the obvious inconvenience of this expedient dictates against its use.

The present invention is directed toward improving the all-over focus of a projected image as it is elevated by tilting of its axial ray. This is accomplished by a novel use of the Scheimpflug principal to rotate the focal plane of the lens system in correspondence with the elevation of the projected image.

The desired results are achieved by separately pivotally mounting the first lens, the mirror and the second lens, preferably all about the same axis, and adjusting their relative angular displacements about that axis in accordance with special relationships described herein.

In a preferred form, my projector head structurally comprises several sections. A bottom section is formed by a horizontally disposed lens element and its housing, which is slidably positioned along a vertical post to permit vertical adjustment of the projection head for focussing. This bottom section pivots on a support attaching it to the vertical post. The optical axis of this first lens element is coaxial with the axis of the cone of light projected through the projection stage when the head is in normal position, with the projection axis horizontal. A second front section contains a generally vertically disposed lens element and its housing. This front section is rotatable about the same pivot axis as the bottom section. A mirror is positioned with its surface substantially at the axis of rotation of the two lens sections, and is rotatable about the same pivot axis.

By suitable adjustment of the angles of the lens elements and the mirror relative to the axis of the incoming light cone and the axis of the projected image, the projected image can be elevated on the screen and still remain substantially in focus over its entire area. The adjustment of the three elements, that is the two lens elements and the mirror, can be accomplished manually or by mechanical linkages that adjust for the varying conditions of projection.

My invention will be described in greater detail below and in relation to the appended drawings in which:

FIG. 1 is a side view of a projection head in accordance with the invention, mounted on the vertical post;

FIG. 2 is an enlarged side view of the projection head of FIG. 1 and its mounting;

FIG. 3 is a schematic view of the light rays passing through the projection head where the geometrical axes of the two lens elements intersect at 90°;

FIG. 4 is a similar schematic view showing the light rays in a case where the screen image has been raised;

FIG. 7 is an exploded isometric view from the front and side showing the arrangement of the various parts of the projection head.

Figure 5:
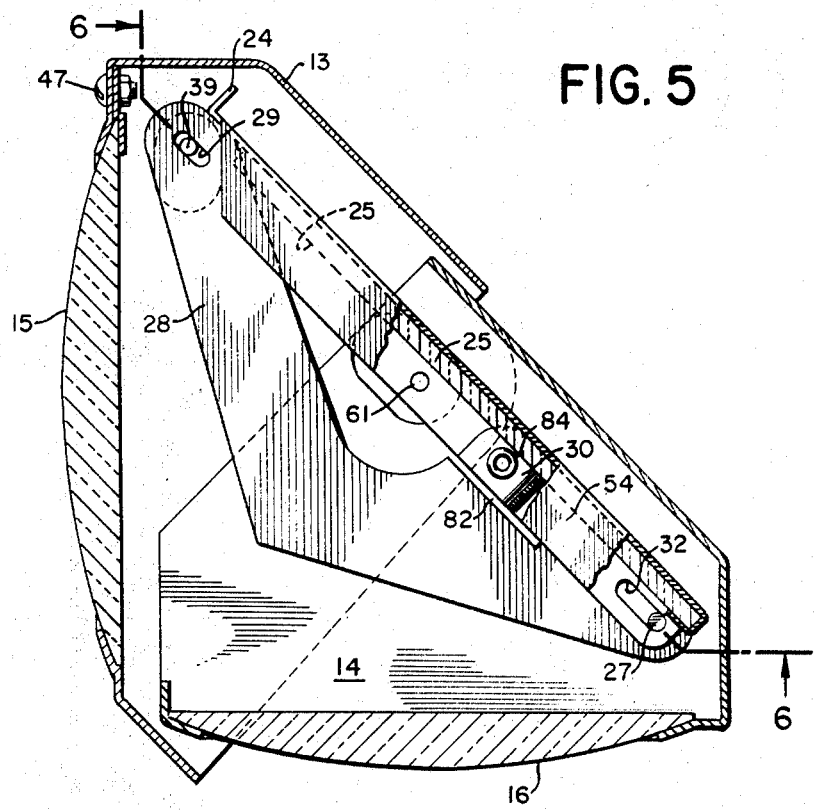
FIG. 5 is an enlarged vertical cross-sectional view of the projection head, viewed from the side opposite to that of FIG. 1.

Referring to FIG. 1 an overhead projector head 51 is mounted on a support arm 11 which in turn is vertically slidably adjustable in any suitable manner on a vertical post 10 by means of a knob 12. Not shown in FIG. 1 is the base of the overhead projector, which may be of any conventional type, generally consisting of a light source and its associated elements which ultimately produce a cone of light 50 passing through the transparency desired to be projected. After passing through the transparency (not shown) the cone of light 50 is directed upward into a first lens element 16 which is a part of projection head 51.

The projection head 51 is of generally the same configuration as that of my copending application above referred to. It has a housing consisting of two relatively movable sections 13 and 14 each of which supports a respective projection lens element 15 and 16. In my new and improved version described herein, both of the housing sections 13 and 14 pivot about a common axis 33, seen in FIG. 2. As will be described in detail below, a mirror 25 is located within the two housings and so arranged as to be rotatable about axis 33, which lies substantially in the plane of the reflecting surface of the mirror.

Before describing in detail the remainder of the construction of a preferred form of the invention, reference is made to FIGS. 3 and 4 for an explanation of the relationship between the optical elements, namely, the two lenses 15 and 16 and the mirror 25.

In FIG. 3, the cone of light 71 is shown passing through the transparency 72 on the projection stage 73, and having an axis 76 along which the axial ray 74 is projected. In this figure, the optical axis 75 of first lens 16 coincides with the axial ray 74. The second lens 15 is in a vertical plane, with mirror 25 at a 45° angle to the vertical, so that the axial ray is reflected by the mirror to a horizontal position 77 coincident with the optical axis 78 of second lens 15. In this condition, the system will project its image straight forward, horizontally to the screen, and the entire image remains in focus, within the capability of the design of the lens elements.

In the prior projection head of my previous application Ser. No. 340,473, now Patent No. 3,334,957, the lens element 16 remained fixedly coaxial with the incident axial ray 74, but the mirror 25 and lens element 15 were pivoted to elevate the image. An angle-bisecting linkage coupled lens element 15 and mirror 25, so that for any angular displacement of the axis of lens element 15, the mirror was caused to be displaced by just half that angle. In this way, the reflected axial ray 77 maintained coincidence with the optical axis 78 of lens element 15 for all angles of tilt of the mirror, and hence for all elevations of the projected screen image.

However, as indicated above, when the reflected axial ray 77 departs from the horizontal, the distances from lens 15 to the vertical screen differ for different parts of the image, the top parts of the image being farther from lens 15 than the bottom parts, causing relative defocussing of the top and bottom of the image when the center is properly focussed. This defocussing is substantially overcome by the present invention, in which the first lens element 16 is made pivotable instead of being fixed, and is angularly displaced in special relation to the remaining optical elements 15 and 25.

FIG. 4 shows a situation in which the reflected axial ray has been rotated by an angle A, to raise the screen image by the same angle A. According to the present invention, the axes of lenses 15 and 16 are no longer kept coincident with the axial ray, as in the prior projection head, but are rotated separately and through different angles.

In all overhead projectors, the transparency is magnified by some magnification factor M, whose value depends upon the focal length F of the projection lens system and upon the distance from the projection head to the screen in relation to the distance from the projection stage to the head. It has been customary to use lenses of 14 inch focal length, providing a magnification M of between 3 and 10, for projectors having a projection stage 10″ x 10″.

According to the present invention, when the image is elevated by angle A, the first lens 16 is pivoted by an amount equal to A divided by $M+1$, or $A/M+1$, The second lens 15 is then pivoted by M times the displacement of the first lens 16. The mirror is pivoted by one-half of A or $A/2$. It can be shown that the mirror displacement is then just one-half the sum of the displacements of the two lenses.

With the three optical elements adjusted in accordance with the relationship just given, for any image elevation angle A, the entire image will remain substantially in focus on a vertical screen, within the field-flatness capability of the lens system. In effect, the pivoting of the optical elements of the head in the prior overhead projector causes the focal plane of the image to pivot by the same angle A. The present invention utilizes an adaptation of the Scheimpflug theorem to rotate the focal plane back to the vertical, so that substantially uniform focus is obtained over the entire vertical screen image.

In accordance with one aspect of the present invention, the three optical elements may be independently and manually adjusted. By adjusting the mirror, the image may be elevated to the proper angle, and thereafter lenses 15 and 16 may be separately positioned to provide the proper all-over focus condition. To aid in this, suitable calibrations may be provided to show the actual angular deviations of the three elements from the normal conditions of FIG. 3, and the required angular settings of the two lenses may be readily determined as indicated above, once the image elevation angle and magnification are determined. Then the two lenses may be manually adjusted to the computed or indicated positions, to avoid trial and error focussing.

In a preferred form of the invention, the three optical elements are automatically kept in their proper relative angular positions, once the magnification is selected or determined. This arrangement is shown in FIGS. 1, 2 and 5 to 7, as is now further described.

Figure 6:
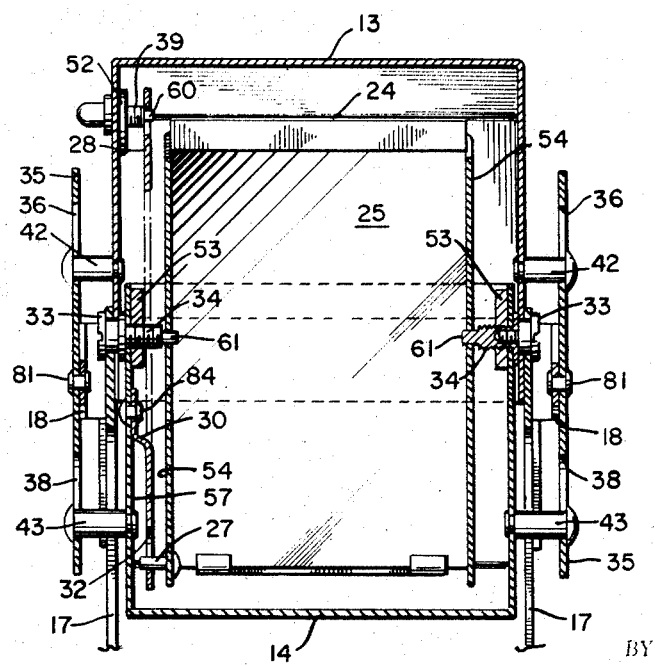
FIG. 6 is a generally vertical cross-sectional view of the projector head, along line 6—6 of FIG. 5.

FIGS. 5, 6 and 7 show more in detail the internal components of the projector head and their arrangement. Referring now, particularly to FIG. 7, which is an exploded view showing the components making up the projection head, the side wall 56 of the front housing section 13 has a boss 52 fixed on the inner surface thereof. A threaded hole 40 is provided through the boss 52 and the side wall 56 to receive the threaded portion of a screw 39. This screw has a hexagonal head and a reduced-diameter smooth cylindrical tip 60 which is adapted to extend through an elongated slot 29 provided in a rocker arm 28, to mechanically link the rocker arm 28 to the front housing section 13. The lower portion of the rocker arm 28 is provided with a slit 82, thereby forming a tab 30, which has an offset end portion 83. A hole 31 is provided in the tab 30 and another elongated slot 32 is formed at the lower end of the rocker arm.

A mounting plate 24 supports mirror 25 and has upstanding side walls 54 having aligned holes 26 therein. The rear surface of the mirror 25 may be cemented to the underlying wall of the mounting plate 24, or the mirror may be secured in position by means of conventional retaining clips or in any suitable manner. Fixed to the side wall 54 is a pin 27 which pin is adapted to extend into the slot 32 of the rocker arm 28 in the assembled head, thereby mechanically coupling the rocker arm 28 to the mirror 25.

The side wall 57 of the bottom housing section 14 is provided with a hole 44. A boss 53 is fixed on the inner surface of the wall 57 and a threaded hole 45 extends through the boss 53 and wall 57 for receiving the threaded portion of a screw 34 having a relatively thin hexagonal head and a reduced diameter tip 61 which in the assembled unit passes through hole 26 formed in the adjacent upturned side wall 54 of the mirror-carrying plate 24. Further, screw 34 is provided with an axial threaded hole for receiving the threaded shank of a screw 33.

When assembled, hole 44 in the side wall of the bottom housing section 14 is aligned with hole 31 in the tab 30 of the rocker arm. A rivet 84 passing through these aligned holes 31, 44 pivotally secures the rocker arm 28 to the bottom housing section 14.

Attached to the exterior of the side wall 56 of front housing section 13 is a stud 42. A second stud 43 is attached to the exterior of side wall 57 of bottom housing section 14. A connecting strap 35 having two slots 36, 38 is mounted between the two studs with stud 42 movably mounted in slot 36 and stud 43 movably mounted in slot 38. Where studs 42, 43 are provided with enlarged heads, these heads may be separately threaded screws, or else studs 42, 43 may be screwed to their respective housings. A rivet 81 rotatably connects hole 37 in the center of straps 35 to hole 59 in bracket arm 18. Arm 18 is in turn part of a bracket 19 which is slidably mounted on support arm 11. An upwardly extending leg 20 on support 19 has a threaded hole therein designed to engage a screw 21. Screw 21 is rotatably mounted in a bracket 22 fixed to support arm 11, and is rotatable by knob 23. It is therefore apparent that by rotation of knob 23 the pivot point 59 of bar 35 is adjustable to any selected position parallel to the back of support arm 11.

In assembling the projection head, the tab 30 of the rocker arm 28 is pivotally secured to the inside of the side wall 57 of the lower housing section 14 by a rivet 84 passing through hole 31 and hole 44, so that the rocker arm 28 is rotatable about the axis of the rivet 84. Next, the mounting plate 24 (carrying the mirror 25) is positioned within the lower housing portion 14 with the pin 27 passing through the elongated slot 32 provided at the lower end of the rocker arm 28. The screw 34 is then threaded through threaded hole 45 provided in the side wall 57 of the lower housing section 14. When the head of the screw 34 abuts the housing wall 57, the tip 61 of the screw 34 passes through the hole 26 formed in the upturned side wall 54 of the mirror-carrying plate 24. A similar hole 45 and screw 34 are provided on the other side wall of lower housing section 14 to engage the second hole 26 in mirror plate 24, so that the plate 24 and mirror 25 are pivotally mounted in the lower housing section 14 about an axis joining holes 26 and 45.

The open end of the front housing section 13 now is slidably inserted over the lower housing section 14 until a pair of opposed holes 41 formed in the side wall 56 of the front housing section 13 are positioned over the heads of screws 34. The two housing sections 13, 14 are also now placed within the side walls 17 of support arm 11 so that its opposed holes 58 are in register with holes 41 of the front housing side wall 56 and the heads of screws 34. Screws 33 are now threaded into the axial threaded holes provided in screws 34. In practice each screw 34 has a relatively thin head thereby to reduce to a minimum the spacing between adjacent side walls 56, 57 of the two housing sections 13, 14. Also, each outer screw 33 has an enlarged smooth-walled shank portion (as appears in FIG. 6) fitting rotatably within the corresponding hole 41 formed in the side wall 56 of the front housing section 13, and within hole 58 of the support arm side wall 17, thereby providing a bearing surface for relative rotation of the two housing sections 13, 14 within support arm 11. A corresponding arrangement is provided on the other side walls of the housings 13, 14 and support arm 11. It will now be clear that the two housing sections 13, 14 and the mirror 25 have a common axis of rotation, fromed by the aligned screws 33, 34, on the two sides of the head.

Rocker arm 28 is now coupled to the front housing section 13 by means of screw 39. When this screw is fully seated its tip 60 passes through the elongated rocker arm slot 29. The description above relates only to the assembly of one side of the projector head. The assembly of the other side may be identical, although where desired, a single rocker arm 28 may be used.

The final step in the assembly of the projection head consists of attaching connecting strap 35 to support 18 by a rivet 81 at hole 59, and connecting strap 35 is then connected to the exterior of the projection head by means of studs 42 and 43.

Considering now the operation of this apparatus, as will be seen in FIG. 5, an angular rotation of the front housing section 13 about the pivot axis defined by the tips 61 of screws 34 causes pin 60 in rocker arm slot 29 to impose a corresponding rotation to the rocker arm 28 about its pivot point, namely, the rivet 84 passing through holes 31 and 44. Such rotation of the rocker arm 28 causes its slot 32 to bear on pin 27 and thereby to impart a rotation to the plate 24 and the mirror 25. The distances between the pivot points 60, 27 and 84 are selected as described in my copending application Ser. No. 340,473 so that the required ratio of 2:1 between rotation of the lens element and the mirror is obtained. The rocker arm 28 is the same as in said prior application.

While the foregoing description has not referred to movement of the lower housing section 14, the arrangement automatically causes the mirror to remain normal to the bisector of the angle made by the optical axes of the two lens elements 16, 15 despite displacement of either or both of those lens elements and their housings 13, 14.

As is apparent from the above description, housing section 13 and housing section 14 rotate about the common axis 61—61 fixed by the screws 33. The connecting strap 35, however, determines the relative rotation between the two housing sections when either one of them is displaced. This can best be seen from FIG. 2, where $D_2$ is the distance from front housing stud 42 to pivot 33, $D_1$ is the distance from pivot 33 to lower housing stud 43, $L_2$ is the distance between pivot 81 and front housing stud 42, and $L_1$ is the distance between pivot 81 and lower housing stud 43.

If front housing 13 is displaced by an angle B about pivot 33, stud 42 will cause strap 35 to rotate about pivot 81. Strap 35 will rotate through an angle approximately equal to $$\frac{D_2}{L_2} \times B$$

Then strap 35 drives stud 43 to pivot it and lower lens housing section 14 about pivot 33. The displacement of lower housing section 14 is then through an angle about $L_1/D_1$ times the angle of strap 35, or $$\frac{D_2}{L_2} \times \frac{L_1}{D_1} \times B$$

According to one aspect of the invention, as indicated above, the displacement of lower housing section 14 should be $1/M$ times that of the front housing section 13. Therefore, according to the invention, $$\frac{D_2}{D_1} \times \frac{L_1}{L_2}$$

is made substantially equal to $1/M$ and $$M = \frac{D_1}{D_2} \times \frac{L_2}{L_1}$$

In one embodiment of the invention, a mean or intermediate value of magnification M over its intended range of variation, is selected for the purpose of determining $D_1$, $D_2$, $L_1$ and $L_2$. In such a case, element 19 may be fixed to or form a part of support arm 11, and elements 20, 21, 22, 23 may be omitted. Thus an improvement in uniformity of focus is obtained, with maximum improvement when operating at the selected means or intermediate value, and lesser improvements when operating at other values.

However, to obtain the greatest benefits from the invention, the ratio of relative movement of the two housing sections 13, 14 is made to correspond to whatever magnification is being used in operation.

For this purpose, $L_1$ and $L_2$ are made adjustable, by making pivot point 81 shiftable. By rotating knob 23, element 19 (and hence pivot 81) is moved. By selecting the location of pivot 81 in correspondence with the magnification being used, so that $$M = \frac{D_1}{D_2} \times \frac{L_2}{L_1}$$

the proper relationship between the movements of the two housing sections 13, 14 is automatically attained.

For example, for a magnification of 9:1, the following values might be used:

$D_1 = 2\frac{1}{4}''$
$D_2 = \frac{3}{4}''$
$L_2 = 2\frac{1}{4}''$
$L_1 = \frac{3}{4}''$ By adjusting the location of pivot point 31 so that $L_1 = L_2 = 1\frac{1}{2}''$, a ratio of 3:1 would be obtained, suitable for $M = 3$.

The various magnifications can be precalibrated by a scale 49 on support 11 so that pointer 48 can be directly adjusted to any magnification being used without necessity of individual computations for each set up of the projector. If desired, a fixed pivot point 59 can be substituted if the location of the projector and screen are to remain constant or if sufficient improvement is obtained from a fixed intermediate setting.

In this way, the two housing sections 13, 14 are caused to be displaced in the ratio of M whenever either one of them is moved. The mirror 25 is coupled directly to both housing sections 13, 14 so as to continuously bisect the angle between them. In this way, the required relative movement of all three optical elements is obtained for maintaining uniform focus. It is only necessary to set in the magnification being used and then to adjust either lens housing section to raise the image on the screen to the desired point. The linkages coupling the optical elements together then automatically sets all three optical elements to the proper relative positions for maintaining focus over the whole image.

In a further embodiment of the invention, even the requirement for setting in the magnification can be eliminated. Focussing and hence magnification is substantially inversely proportional to the height of the projection head above the stage. In place of manually adjusting the magnification setting knob 23, it may be suitably coupled to the focussing knob 12 to adjust the pivot point 31 in proportion to the raising or lowering of the head above the stage. Then, merely by focussing the image properly on the screen, the proper magnification setting is introduced which will maintain substantially uniform focus over the image for all angles of elevation of the image on the screen.

The lenses 15, 16 have been illustratively shown as concavo-convex or meniscus lens elements. However, the present invention is not limited to such lenses, since any lens elements suitable for a projection lens or objective may be used. For example, either or both lens 15, 16 may be a cemented doublet, a spaced doublet, a simple element, or any other component of an objective. In addition, in some low-cost uses of the invention either lens 15 or 16 may be omitted, in which case the mirror 25 is nevertheless displaced by an angle one half of the screen image elevation angle, while the displacement of the single lens will be the same as that described above, namely either $$\frac{MA}{M+1}$$

if it is between mirror and screen or $$\frac{A}{M+1}$$

if it is between stage and mirror.

Accordingly the present invention has provided a novel process and apparatus for overhead and like projectors, for maintaining substantially uniform focus over a screen image despite raising or lowering of that image by tilting optical elements of the projection head. This is accomplished by a special interrelationship between the displacements of the optical elements of the head. It will be obvious that the present invention is suitable for use wherever a bent or folded projection lens system (i.e., one having a mirror associated therewith) may be tilted to cause its projection axis to become slanted relative to the screen, so as to depart from uniform focus over the screen image. It is to be understood that the foregoing description is only illustrative of the invention, which is defined solely by the claims granted to me.

I claim as my invention:

1. In a projector having a generally horizontal projection stage for supporting material to be projected, means for producing a converging cone of light above said stage with a substantially vertical axial ray; a projection head having a first converging lens with a generally vertical optical axis and positioned to intercept said cone of light, a reflecting surface positioned in the path of said cone of light after passage through said first lens for diverting said axial ray to a generally horizontal direction, and a second converging lens positioned in the path of the light rays of said cone of light after reflection from said surface and having a generally horizontal optical axis; a vertical screen in the path of said reflected light rays beyond said second lens, and means for pivotally mounting said reflecting surface about a substantially horizontal pivot axis for raising or lowering said reflected cone axis and the image on said screen; the improvement comprising means for maintaining the focal plane of said reflected light rays substantially vertical despite angular deflection of said reflecting surface, said means comprising means for pivotally supporting each of said lenses about said pivot axis and means for unequally displacing the optical axes of both said lenses.

2. A projector as in claim 1, wherein said first and second lenses are angularly displaceable respective amounts which have a ratio depending upon the magnification of the screen image.

3. A projector as in claim 2 wherein said ratio substantially equals said magnification.

4. In a projector as in claim 3, further means for displacing said mirror angularly by an amount equal to one-half the sum of the displacements of said lenses.

5. A projector as in claim 4 wherein the respective angular displacements of said first lens, said mirror and said second lens are substantially in the proportion of 1 to $\frac{1}{2}(1+K)$ to $K$ where $K$ is a number greater than unity.

6. In a projection head for an overhead projector having a housing comprising front and lower sections, each section carrying a lens element, means pivotally connecting the two housing sections together such that relative rotation of the housing sections alters the angular disposition of the two lens elements relative to each other, a mirror disposed within the housing, said mirror receiving light rays entering the lower housing section through one lens element and reflecting the light rays out of the housing through the other lens element, mounting means pivotally supporting the mirror for rotation of its reflecting surface about the pivot axis of the housing sections, and means for simultaneously pivoting said mirror in correspondence with relative pivoting of said two housing sections; the improvement comprising means for variably interconnecting said two housing sections to provide a preselected ratio greater than unity between their angular displacements.

7. The overhead projector of claim 6 wherein the means for interconnecting said two housing sections comprise two studs, one attached to the external side of each housing section, a connecting strap having two ends, each of said ends being pivotally mounted on one of said studs, and means for pivoting the connecting strap around a selected pivot point intermediate its ends.

8. The projector of claim 7 including means for shifting said selected pivot point.

9. The projector of claim 8 wherein said pivot point is located according to the following formula:

$$M = \frac{D_1}{D_2} \times \frac{L_2}{L_1}$$

where M is substantially the magnification of the projected image, $D_1$ is the distance between the lower housing section stud and the housing pivot axis, $D_2$ is the distance between the front housing section stud and the housing pivot axis, $L_1$ is the distance between the lower housing section stud and the connecting strap pivot point and $L_2$ is the distance between the front housing section stud and the connecting strap pivot point.

10. The projector of claim 8 further including means for automatically adjusting the connecting strap pivot point in correspondence with the magnification of the projected image.

11. In a projection head having a pivotable lens and a mirror receiving light rays passing through said lens and reflecting said light rays toward a screen, mounting means pivotally supporting the mirror for rotation of its reflecting surface about the pivot axis of said lens, and means for simultaneously pivoting said mirror in correspondence with pivoting of said lens; the improvement comprising means for variably interconnecting said mirror and lens to provide a preselected ratio greater than unity between their angular displacements.

12. A projection head as in claim 11, further including means for adjusting said ratio in accordance with image magnification.

13. In a projection head having a pivotable lens and a mirror reflecting light rays out through said lens, mounting means pivotally supporting the mirror for rotation of its reflecting surface about the pivot axis of said lens, and means for simultaneously pivoting said mirror in correspondence with pivoting of said lens; the improvement comprising means for variably interconnecting said mirror and lens to provide a preselected ratio less than unity and greater than one-half between their angular displacements to maintain the projected image focal plane parallel to a fixed plane.

14. A projection head as in claim 13, further including means for adjusting said ratio in accordance with image magnification.

15. A projection head comprising front and lower lenses, means pivotally supporting each of said lenses about a common axis such that relative rotation of said lenses alters the angular disposition of their optical axes relative to each other, a mirror, said mirror receiving light rays passing through one lens and reflecting the light rays through the other lens, mounting means pivotally supporting the mirror for rotation of its reflecting surface about the pivot axis of said lenses, means for simultaneously pivoting said mirror in correspondence with relative pivoting of said two lenses, means for variably interconnecting said two lenses to provide a preselected ratio greater than unity between their angular displacements and means for adjusting said ratio.

16. The method of elevating a projected screen image comprising the steps of projecting the image onto a pivotable reflecting surface and through a projection lens associated with said reflecting surface, pivotally displacing said reflecting surface to change the elevation of the projected image, and pivotally displacing said lens between one and two times said reflecting surface displacement to maintain the focal plane of the projected image at the new elevation in a plane substantially coplanar with the screen.

17. The method as in claim 16 wherein said last step comprises pivotally displacing said lens by an amount dependent upon both said reflecting surface displacement and the magnification of said projected image.

18. The method of elevating a projected screen image comprising the steps of projecting the image onto a pivotable reflecting surface and then through a projection lens associated with said reflecting surface, pivotally displacing said reflecting surface to change the elevation of the projected image, and pivotally displacing said lens by an amount substantially equal to said reflecting surface displacement divided by $$\frac{(M+1)}{2M}$$

where M is the magnification of said projected image.

19. The method of elevating a projected screen image comprising the steps of projecting the image through a lens and then onto a pivotable reflecting surface associated with said lens, pivotally displacing said reflecting surface to change the elevation of the projected image, and pivotally displacing said lens by an amount substantially equal to said reflecting surface displacement multiplied by $$\frac{2}{(M+1)}$$

where M is the magnification of said projected image.

20. The method of elevating a projected screen image comprising the steps of projecting the image through a first lens onto a pivotal reflecting surface associated with said lens, projecting the reflected image through a second lens, displacing the first lens through a first angle, displacing the second lens through a second angle which is a multiple of said first angle, and displacing the reflecting surface through an angle which is substantially one-half the sum of said first and second angles.

21. A method as in claim 20 wherein said multiple is substantially equal to the magnification of said projector.

22. The method of elevating a projected image on a substantially vertical screen comprising the steps of projecting the image through a first lens onto a pivotable reflecting surface associated with said lens, projecting the reflected image through a second lens associated with said reflecting surface, tilting the mirror to locate the desired position of the projection axis and projected image, and separately tilting the first and second lenses to restore the image focal plane to a substantially vertical position.

23. The method of elevating a projected image comprising the steps of projecting the image onto a pivotable reflecting surface and through a projection lens associated with said reflecting surface, pivotally displacing said reflecting surface to change the elevation of the projected image, and pivotally displacing said lens by an amount dependent upon both said reflecting surface displacement and the magnification of said projected image to maintain the focal plane of the projected image at the new elevation substantially co-planar with its position prior to said displacements.

24. The method of elevating a projected image comprising the steps of projecting the image through a first lens onto a pivotable reflecting surface associated with said lens, pivotally displacing said reflecting surface to change the elevation of the projected image, and pivotally displacing said lens by an amount different from the reflecting surface displacement to maintain the focal plane of the projected image at the new elevation substantially co-planar with its position prior to said displacement.

25. The method as in claim 24 wherein said lens is displaced by an amount dependent upon both said reflecting surface displacement and the magnification of said projected image.

References Cited

UNITED STATES PATENTS 3,191,491  6/1965  Pignone et al.

FOREIGN PATENTS 990,930  5/1965  Great Britain.

NORTON ANSHER, Primary Examiner

RICHARD M. SHEER, Assistant Examiner

U.S. Cl. X.R.

353—100